(12) United States Patent
Graepel et al.

(10) Patent No.: US 7,837,543 B2
(45) Date of Patent: Nov. 23, 2010

(54) REWARD-DRIVEN ADAPTIVE AGENTS FOR VIDEO GAMES

(75) Inventors: Kurt Hartwig Graepel, Cambridge (GB); Ralf Herbrich, Cambridge (GB); Julian Gold, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1550 days.

(21) Appl. No.: 10/837,415

(22) Filed: Apr. 30, 2004

(65) Prior Publication Data

US 2005/0245303 A1  Nov. 3, 2005

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/1; 463/7; 463/8; 463/30; 463/49

(58) Field of Classification Search .............. 463/1, 463/7–8, 30, 49
See application file for complete search history.

(56) References Cited

U.S. PATENT DOCUMENTS

| 6,195,626 | B1 | 2/2001 | Stone |
| 6,199,030 | B1 | 3/2001 | Stone |
| 6,487,304 | B1 | 11/2002 | Szeliski |

OTHER PUBLICATIONS

Pieter Spronck, Ida Sprinkhuizen-Kuyper and Eric Postma (2003). Online Adaptation of Game Opponent AI in Simulation and in Practice. Proceedings of the 4th International Conference on Intelligent Games and Simulation (Game-On 2003) (eds. Quasim Mehdi and Norman Gough), ISBN: 90-77381-05-8, pp. 93-100. EUROSIS, Belgium.*
"Black and White: FAQ/Walkthrough", GameFAQs.com, Apr. 22, 2002, <http://www.gamefaqs.com/computer/doswin/file/914356/11124>.*
Bennewitz, M., et al., "Using EM to Learn Motion Behaviors of Persons with Mobile Robots," Proceedings of the 2002 IEEE/RSJ International Conference on Intelligent Robots and Systems EPFL, Lausanne, Switzerland, Oct. 2002, pp. 502-507.
Sutton, Richard S. and Andrew G. Barto, "Reinforcement Learning: An Introduction," MIT Press, Cambridge, MA, 1998, A Bradford Book, available at http://www-anw.cs.umass.edu/~rich/book/the-book.html, retrieved Apr. 30, 2004, pp. 1-4.

* cited by examiner

*Primary Examiner*—Dmitry Suhol
*Assistant Examiner*—Jason Pinheiro

(57) ABSTRACT

Adaptive agents are driven by rewards they receive based on the outcome of their behavior during actual game play. Accordingly, the adaptive agents are able to learn from experience within the gaming environment. Reward-driven adaptive agents can be trained at either or both of game-time or development time. Computer-controlled agents receive rewards (either positive or negative) at individual action intervals based on the effectiveness of the agents' actions (e.g., compliance with defined goals). The adaptive computer-controlled agent is motivated to perform actions that maximize its positive rewards and minimize is negative rewards.

20 Claims, 7 Drawing Sheets

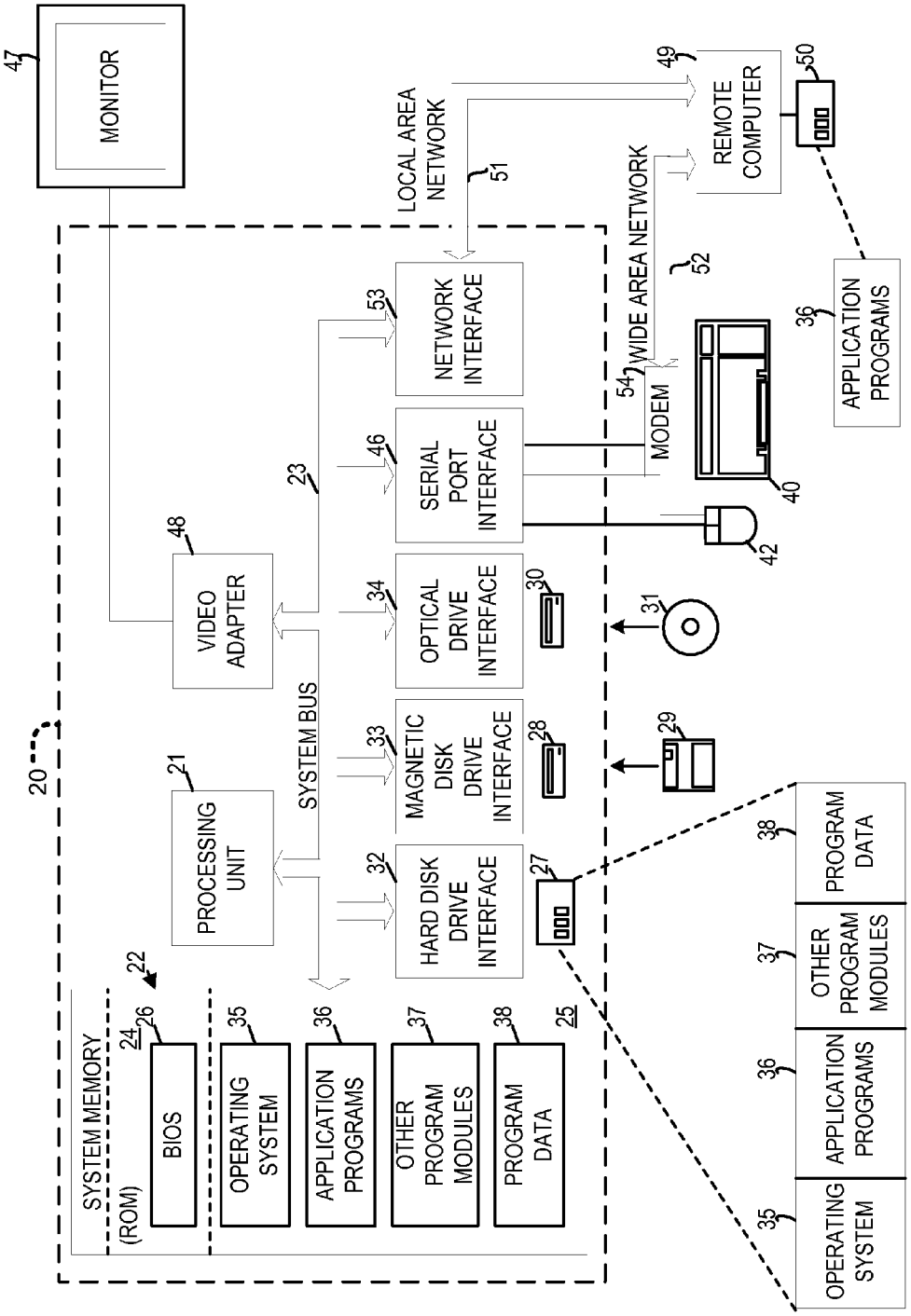

US 7,837,543 B2

REWARD-DRIVEN ADAPTIVE AGENTS FOR VIDEO GAMES

TECHNICAL FIELD

The invention relates generally to machine learning, and more particularly to reinforcement learning in video games.

BACKGROUND

Many video games involve interaction between one or more human-controlled characters and one or more computer-controlled agents. Such computer-controlled agents can play the roles of opponents and/or teammates of the human-controlled characters. For example, a video soccer game may involve one or more human-controlled players (opponents or teammates) playing alongside players (opponents and teammates) that are controlled by the computer, such as the game console.

In existing approaches, a computer-controlled agent is typically implemented according to a fixed set of state-action policies, which control a computer-controlled agent's reaction to a given state in the video game. For example, when a human-controlled player shoots a soccer ball to the computer-controlled goalkeeper's right, the policy may cause the computer-controlled goalkeeper to dive to the right in an attempt to stop the shot. Depending on the state of the game, including potentially the timing, speed, and direction of the shot; the positions and movements of the shooting player, the goalkeeper and other players; as well as other parameters, a variety of new game states may result (e.g., the goalkeeper blocks the shot, the shot scores, the shot misses, another player deflects or blocks the shot, etc.). The state-action policies controlling this behavior may include a static, fixed set of policies that are set at development time, such that a predefined action is set to execute in response to given sets of state conditions.

Alternatively, some random or probabilistic selection from a defined group of actions associated with a given set of state conditions may be made to provide a more appealing variety in game play. In this approach, the computer-controlled agent may react to a given game state with one action in one instance and react to the same game state with a different action in another instance. Nevertheless, the predefined action-state mappings, whether purely static or randomly/probabilistically selected from a static set of options defined at development time, mean that the computer-controlled agents are unable to adapt to changing circumstances after development time, particularly to changes in the human player's behavior during game play.

SUMMARY

Implementations described and claimed herein address the foregoing problems by introducing reinforcement learning techniques to create adaptive agents that are driven by rewards to learn from experience. The rewards are derived from the perceived effectiveness of their behavior during actual game play. Reward-driven adaptive agents can be trained at either or both of game-time or development time. In particular, training during game play, in response to interaction with either or both of human-controlled players or other computer-controlled agents, dramatically improves the human player's gaming experience by offering dynamically adaptive variety of computer-controlled agents during game play.

Computer-controlled agents receive rewards (either positive or negative) based on the effectiveness of the agents' actions (e.g., compliance with a defined goal). The computer-controlled agent therefore is motivated to perform actions that maximize its positive rewards and minimize is negative rewards.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for a computer process executing on a computer system. The computer process adapts a policy for an adaptive agent toward a defined goal within a gaming environment. The policy selects a first action from a plurality of available actions for application to a first state of the gaming environment during a first action interval. The first action within the gaming environment is applied to produce a second state of the gaming environment. The policy selects a second action from the plurality of available actions for application to the second state of the gaming environment during a second action interval. The policy is then modified based on compliance of the second state with the defined goal. The process may continue in an iterative manner for subsequent states.

In another implementation, a method is provided that adapts a policy for an adaptive agent toward a defined goal within a gaming environment. The policy selects a first action from a plurality of available actions for application to a first state of the gaming environment during a first action interval. The first action within the gaming environment is applied to produce a second state of the gaming environment. The policy selects a second action from the plurality of available actions for application to the second state of the gaming environment during a second action interval. The policy is then modified based on compliance of the second state with the defined goal. The process may continue in an iterative manner for subsequent states.

In another implementation, a system for adapting behavior of an adaptive agent toward a defined goal within a gaming environment is provided. The policy selects a first action of a plurality of available actions for application to a first state of the gaming environment during a first action interval. A game engine applies the first action within the gaming environment to produce a second state of the gaming environment. The policy further selects a second action of the plurality of available actions for application to the second state of the gaming environment during a second action interval. An adapter modifies the policy based on compliance of the second state with the defined goal. The process may continue in an iterative manner for subsequent states.

Other implementations are also described and recited herein.

BRIEF DESCRIPTIONS OF THE DRAWINGS

FIG. 7 illustrates a system useful for implementing an exemplary adaptive agent.

DETAILED DESCRIPTION

Figure 1:
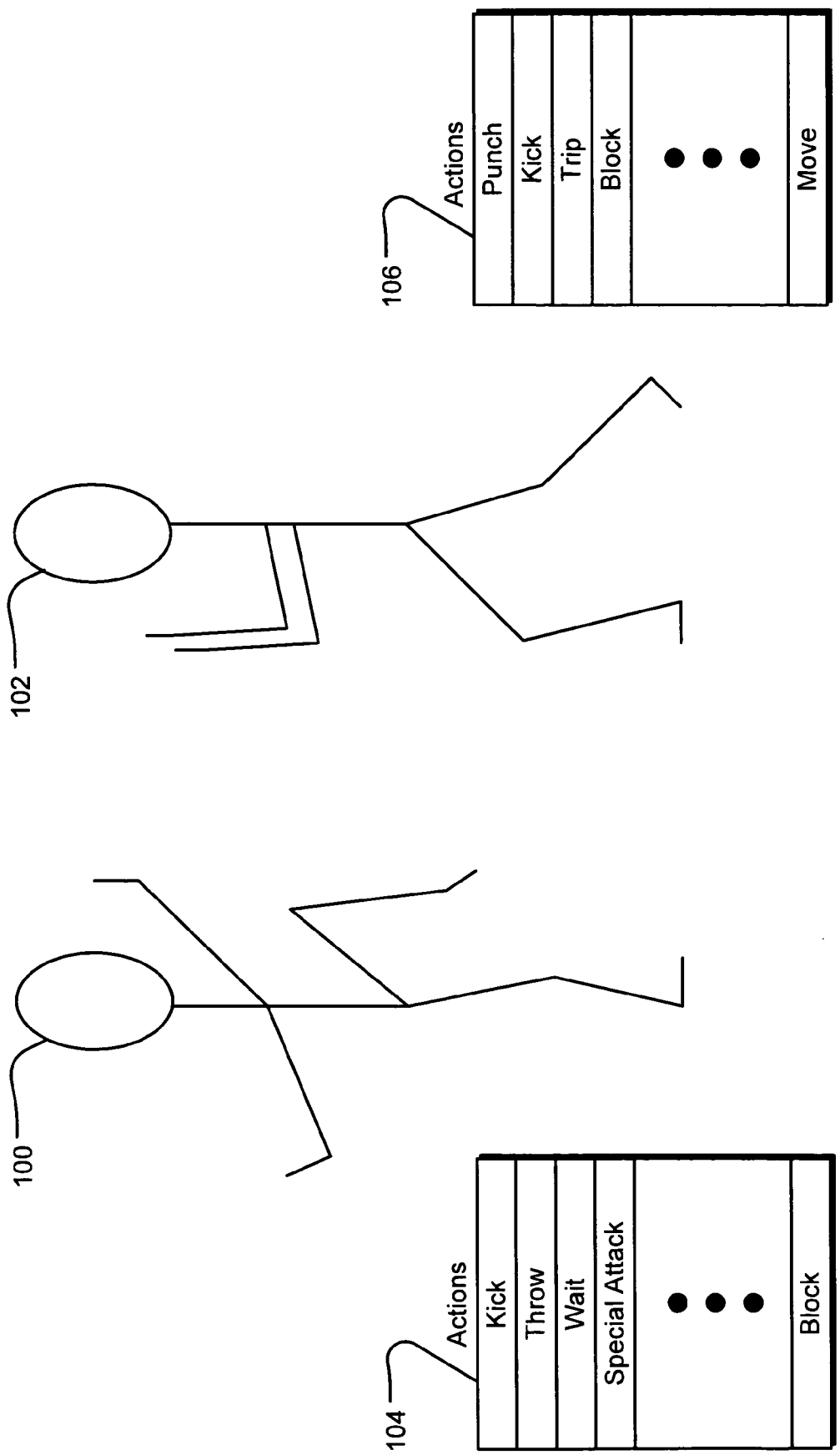
FIG. 1 illustrates two game characters with associated action sets.

FIG. 1 illustrates two game characters 100 and 102 with associated action sets 104 and 106, respectively. The game characters 100 and 102 represent computer-controlled adaptive agents in one-on-one, hand-to-hand combat in a video martial arts game. Human-controlled characters may also select actions from a predefined set of actions. Furthermore, alternative adaptive agents may include a variety of different game play entities, including individual and team sport competitors (e.g., soccer players, tennis players), racing vehicles, military forces, and other interactive entities within a game environment.

In FIG. 1, each character is designated as a computer-controlled adaptive agent, and each character is capable of behaving according to a selection from a predefined set of available actions, although as shown, the predefined set of actions may differ between different characters. The illustrated actions sets 104 and 106 list offensive actions (e.g., kick and punch), neutral actions (e.g., wait), and defensive actions (e.g., block). Alternative action sets for different types of characters may include without limitation character movements; vehicle steering, braking, and acceleration changes; shots on goal; passes; tackles; baseball pitches; tennis serves and volleys, conversations, reaching target positions on virtual maps, etc.

During game play, each character selects an action from its action list based at least on the current game state. However, some actions in the action list may not be available in a given game interval. For example, an agent may not be capable of punching an opponent if the agent is deemed tied up, handcuffed, or unconscious. Likewise, an agent may be unable to change from one action to another in the middle of the first action. For example, an agent that is in the air (e.g., in the process of leaping) may be unable to change immediately to a different action that requires the agent to fall to the ground (e.g., a low tripping move). Accordingly, whether a new action can be executed depends on both the current game state and the nature of the current action. The interval between the start of a first action and the start of a second action is termed an "action interval" and differs from a game interval, as described below.

Figure 2:
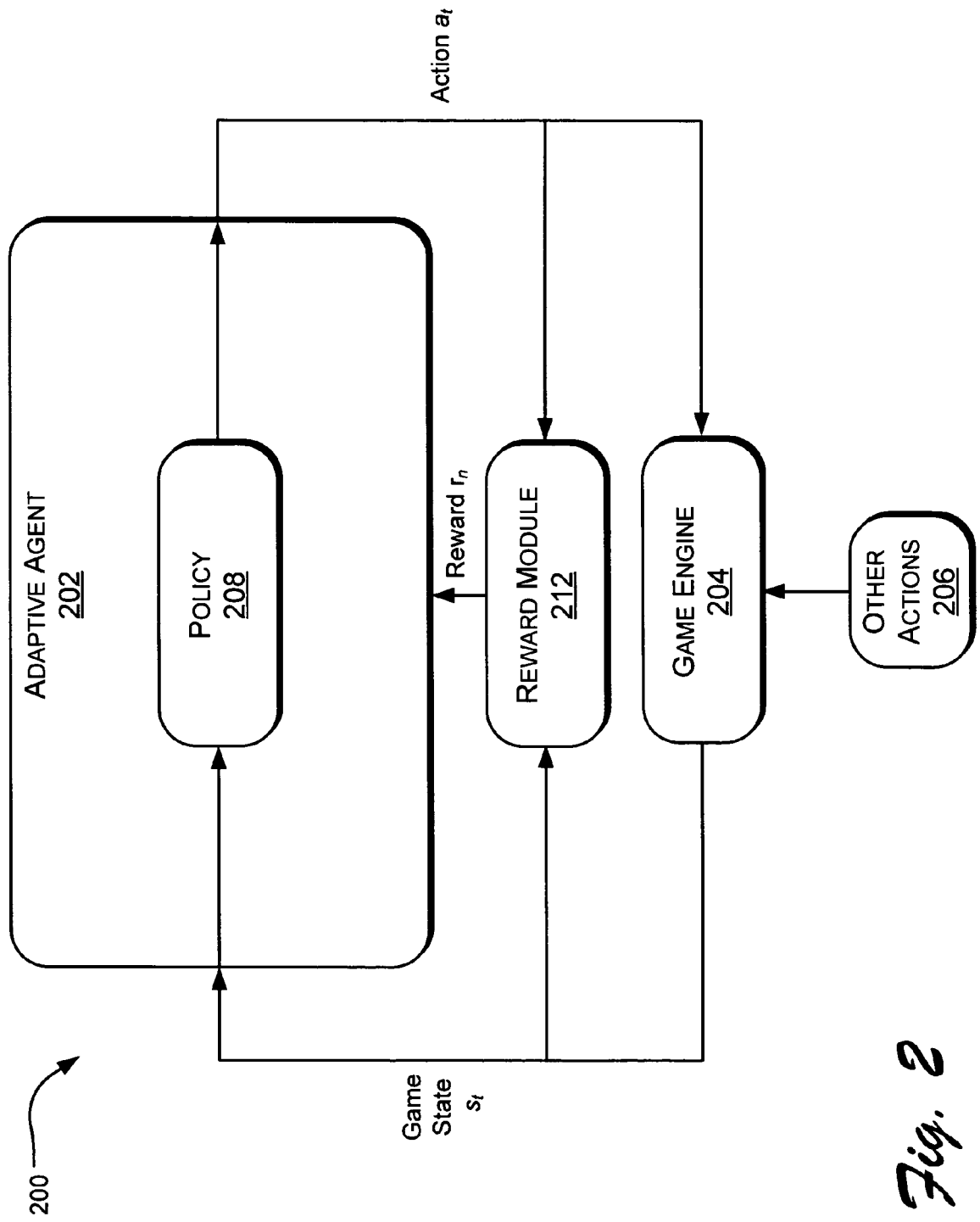
FIG. 2 illustrates a portion of a gaming system supporting an adaptive agent.

FIG. 2 illustrates a portion of a gaming system 200 supporting an adaptive agent 202. The adaptive agent 202 may represent any computer-controlled agent in a video game, such as a combatant in a one-on-one, hand-to-hand combat game. Generally, adaptive agents have explicitly defined goals. Adaptive agents can sense aspects of their environments and can choose actions according to a policy to influence their environments. Moreover, it is usually assumed from the beginning that an adaptive agent operates despite significant uncertainty about the environment it faces.

The adaptive agent 202 seeks a goal, which is typically defined at development time, although the goal may be modified in some manner during runtime. For example, in a typical one-on-one, hand-to-hand combat game, a goal may be defined for the adaptive agent 202 as "inflicting a maximum amount of damage on an opponent while suffering a minimum amount of damage itself".

A game engine 204 provides a model of the gaming environment. Generally, given a state $s_t$ and an action $a_t$ at a game interval t, the game engine predicts the next state $s_{t+1}$ resulting from application of the action $a_t$ (and possibly other actions 206 from other entities) in the gaming environment. A game interval may be defined at development time to represent a fundamental time period within the game environment. For example, a game interval may represent the time between video frames, a predefined period of time in a real-time simulation, or some other uniform interval.

A policy defines the adaptive agent's way of behaving at a given time within the gaming environment. Generally, a policy $\pi$ is a mapping from perceived game states $s \in S$ of the gaming environment to actions $a \in A(s)$ to be taken in those game states. The symbol S represents the set of all possible game states that can be considered by the adaptive agent. The symbol $A(s)$ represents the set of all possible actions that can be taken in the presence of the game state s. Metaphorically, a policy might approximate a set of stimulus-response rules or associations, in which states represent stimuli and actions represent responses It is possible to represent an exemplary policy as a simple function or lookup table, whereas other policies may involve extensive computation, such as a search process. Policies may also be stochastic in nature. In an exemplary implementation, a policy $\pi$ may be represented as the probability $\pi(s,a)$ of taking an action a when the gaming environment is in a game state s.

In some implementations, a policy may be adapted according to a training session based on the same policy (i.e., "on-policy learning"). In other implementations, the agent's behavior is driven during the training session by one policy, but the adaptive updates during the training session are applied to a different policy (i.e., "off-policy learning").

In light of the combat nature of the gaming scenario illustrated by FIG. 2, a policy 208 is shown. The policy 208 selects offensive (e.g., kick, throw, punch, etc.), neutral (e.g., stand still), and defensive (e.g., block, duck, retreat, etc.) actions for the adaptive agent 202. The policy 208 of the adaptive agent 202 adapts according to the adaptive agent's experience in the gaming environment. A reward module 212 modifies the policy 208 according to the effectiveness of selected actions in seeking the defined goal from a given game state.

The reward module 212 typically defines the goal, which is typically specified at development time, or has access to the goal definition. Generally, the reward module 212 is synchronized with action intervals n, instead of game intervals t (see the description of FIG. 6). The reward module 212 maps perceived states (or state-action pairs) of the gaming environment to a reward parameter $r_n$ that indicates the intrinsic desirability of the application the action a, to the state $s_n$, which leads to the state $s_{n+1}$ within the gaming environment. An adaptive agent strives to maximize the total reward received over the course of multiple actions in accordance with a predefined goal.

The reward module 212 is synchronized on action intervals and evaluates a state resulting from a given action performed in response to a previous state to assign a positive or negative reward to the previous state-action pair. In one implementation, the reward module 212 is defined at development time, although some runtime modifications to the reward module 212 are also contemplated. Reward parameters generated by a reward module 212 may be used as a basis for adapting the policy 208. For example, if an action selected by the policy is followed by low reward relative to a given state, then the policy may be changed to select (or to be more likely to select)

a different action in that state in the future. Reward functions may be deterministic or stochastic.

Figure 3:
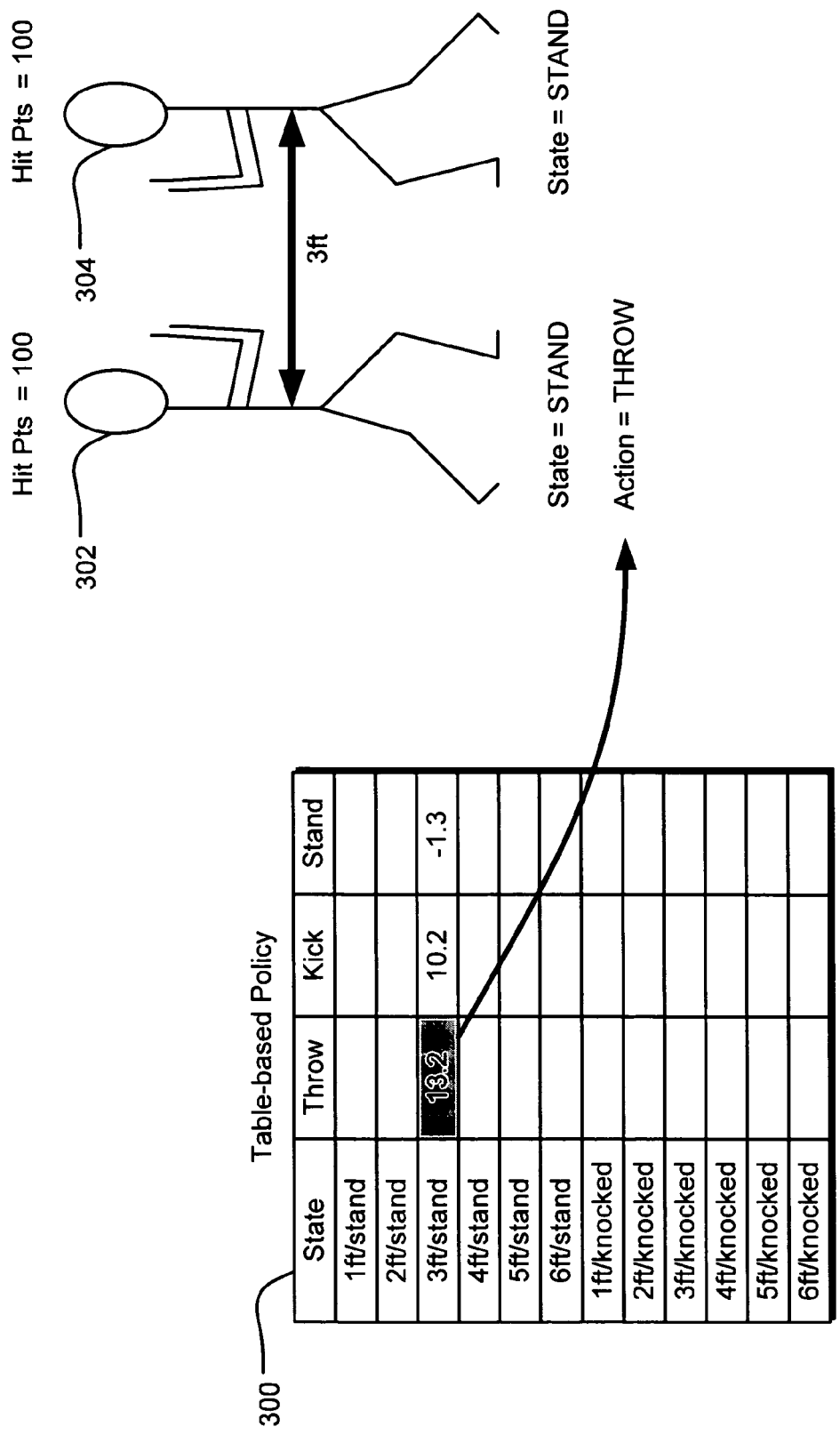
FIG. 3 illustrates a table-based policy for an adaptive agent.

FIG. 3 illustrates a table-based policy 300 (denoted as π) for an adaptive agent 302. The adaptive agent 302 is fighting with an opponent 304. For ease of description, the policy 300 designates a limited list of state features (in the first column) that it supports. However, it should be understood that a policy may support a rich variety of state features. In addition, policies may be implemented in non-tabular forms, including without limitation neural networks, stochastic models, and other algorithmic systems.

The policy 300 supports three actions for adaptive agent 302: "throw", "kick", and "stand" (in the second through fourth columns). Again, it should be understood that a rich variety of actions may be supported by a given policy. The internal cells of the policy 300 hold action values (denoted by the symbol Q).

Exemplary Q values are given for the three actions in the state "3 ft/stand", which corresponds to the states illustrated by the characters 302 and 304 in the current action interval n (the "stand" feature referring to the status of the opponent 304). It should be understood that the actual game state may include a rich set of state features; however, in the illustrated example, the policy 300 considers only the two-element condition state of the agent 302 (i.e., STAND or KNOCKED, as in "knocked down") and the physical separation (or distance) of the agent 302 from its opponent 304. In one implementation, these features of interest are filtered from the general game state and presented to the policy 300.

In the example of FIG. 3, the state features set of "3 ft/stand" is detected by the policy 300. The corresponding Q values associated with three possible actions are evaluated to select the action having the highest Q value for that state feature set. In the illustrated scenario, the evaluation results in selection of a "throw" action. It should also be noted that, prior to application of the action within the gaming environment, both characters possess 100 hit points. Furthermore, while some implementations may strictly seek the highest Q value, this approach may find only local maxima in certain circumstances. Therefore, other implementations may also search for locally non-optimal actions (e.g., by some deterministic or random manner) in order to find a globally optimal solution.

The defined goal of the adaptive agent 302 is to maximize damage to the opponent 302. However, generally, defined goals may take many different forms. For example, goals may be set differently for different agents to provide additional variability of game play (e.g., a defensive agent may aim to minimize the amount of damage it suffers, while an offensive agent may aim to maximize the amount of damage it inflicts on its opponent). In addition, a goal may be compound in nature (e.g., such that an adaptive agent inflicts maximum damage on an opponent while suffering minimum damage itself).

Figure 4:
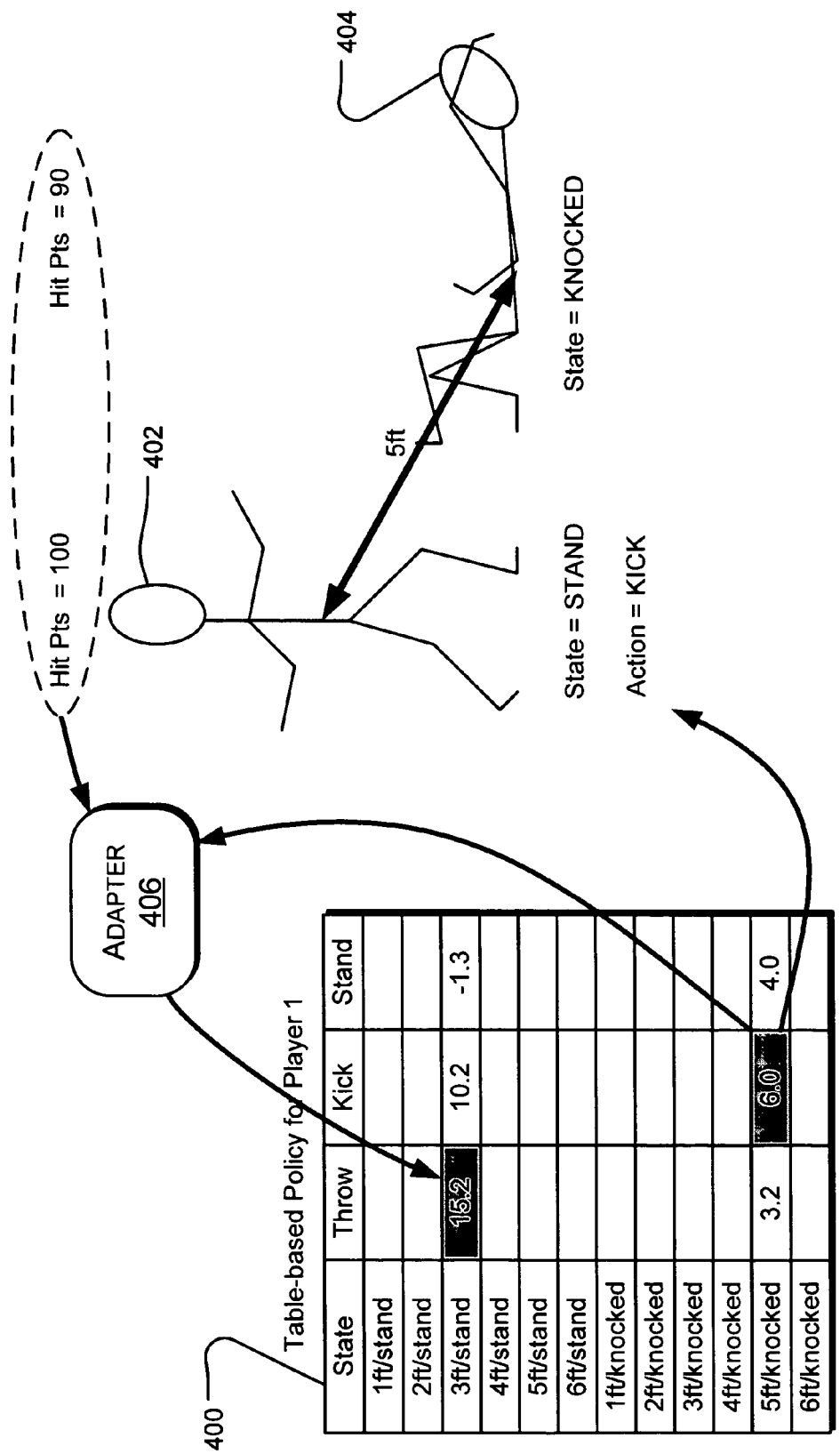
FIG. 4 illustrates a table-based policy for an adaptive agent, including selected actions in two action intervals.

FIG. 4 illustrates a table-based policy 400 (denoted as π) for an adaptive agent 402, including selected actions in two action intervals n and n+1. The adaptive agent 402 is fighting with an opponent 404, which has been knocked down as a result of the previously selected "throw" action of the adaptive agent 402. As a result of the previous "throw" action, the opponent 404 has also suffered 10 hit points of damage, which results in a positive reward parameter rt. The positive reward parameter is input to the adapter 406, which adjusts the action value of the previous action interval n from 13.2 to 15.2. This adjustment represents recognition that a "throw" action executed in a "3 ft/stand" state produces a "good" result toward the defined goal of inflicting damage on the opponent 404.

In the example of FIG. 4, the state feature set of "5 ft/knocked" is detected by the policy 400 in the subsequent action interval n+1. The corresponding Q values associated with three possible actions are evaluated to select the action having the highest Q value for that state feature set, resulting in selection of a "kick" action, which has the highest action value at 6.0.

To this point, parameters from two action intervals n and n+1 have been computed: $s_n$="3 ft/stand", $a_n$="throw", $s_{n+1}$="5 ft/knocked", $a_{n+1}$="kick", and $r_t$="+10". In addition, the previous action value of $Q_{-1}^\pi(s_n, a_n)$ is known (i.e., 13.2). The new action value (e.g., 15.2) is computed from an action-value function $Q^\pi(s_n, a_n)$, which predicts an expected long-term reward when starting in state $s_t$, taking the action $a_t$, and following policy π thereafter.

In one implementation, an action-value function takes the form:

$$Q^\pi(s_n, a_n) = Q_{-1}^\pi(s_n, a_n) + \alpha\left[r_n + \gamma \max_{a_{n+1}} Q_{-1}^\pi(s_{n+1}, a_{n+1}) - Q_{-1}^\pi(s_n, a_n)\right] \quad (1)$$

where $Q_{-1}^\pi(s_n, a_n)$ represents the magnitude of the action value prior to its adaptation, α represents a predefined weighting factor, $r_n$ represents the reward value computed for the current action interval, and γ represents a discount rate, which determines the present value of future rewards—a reward received k action intervals in the future is worth only $\gamma^{k-1}$ times what it would be worth if it were received immediately. If γ<1, the infinite sum has a finite value as long as the reward sequence $\{r_n\}$ is bounded.

Action values $Q^\pi$ contribute to defining what is "good", relative to the defined goal, in the long run. Generally, the action value associated with a given game state, as defined by an action-value module, represents the total amount of reward that an adaptive agent can expect to accumulate over multiple cycles starting from that game state and applying the action associated with the action value. Whereas rewards determine the immediate, intrinsic desirability of environmental states, action values indicate the long-term desirability of states after taking into account the states that are likely to follow and the rewards that are available in those states. For example, a game state might always yield a low immediate reward, but still have a high value because the state is regularly followed by other game states that yield high rewards. Or the reverse could be true. To make a human analogy, rewards are like pleasure (if high) and pain (if low), whereas values correspond to a more refined and far-sighted judgment of how pleased or displeased one should be that the gaming environment is in a particular state.

Figure 5:
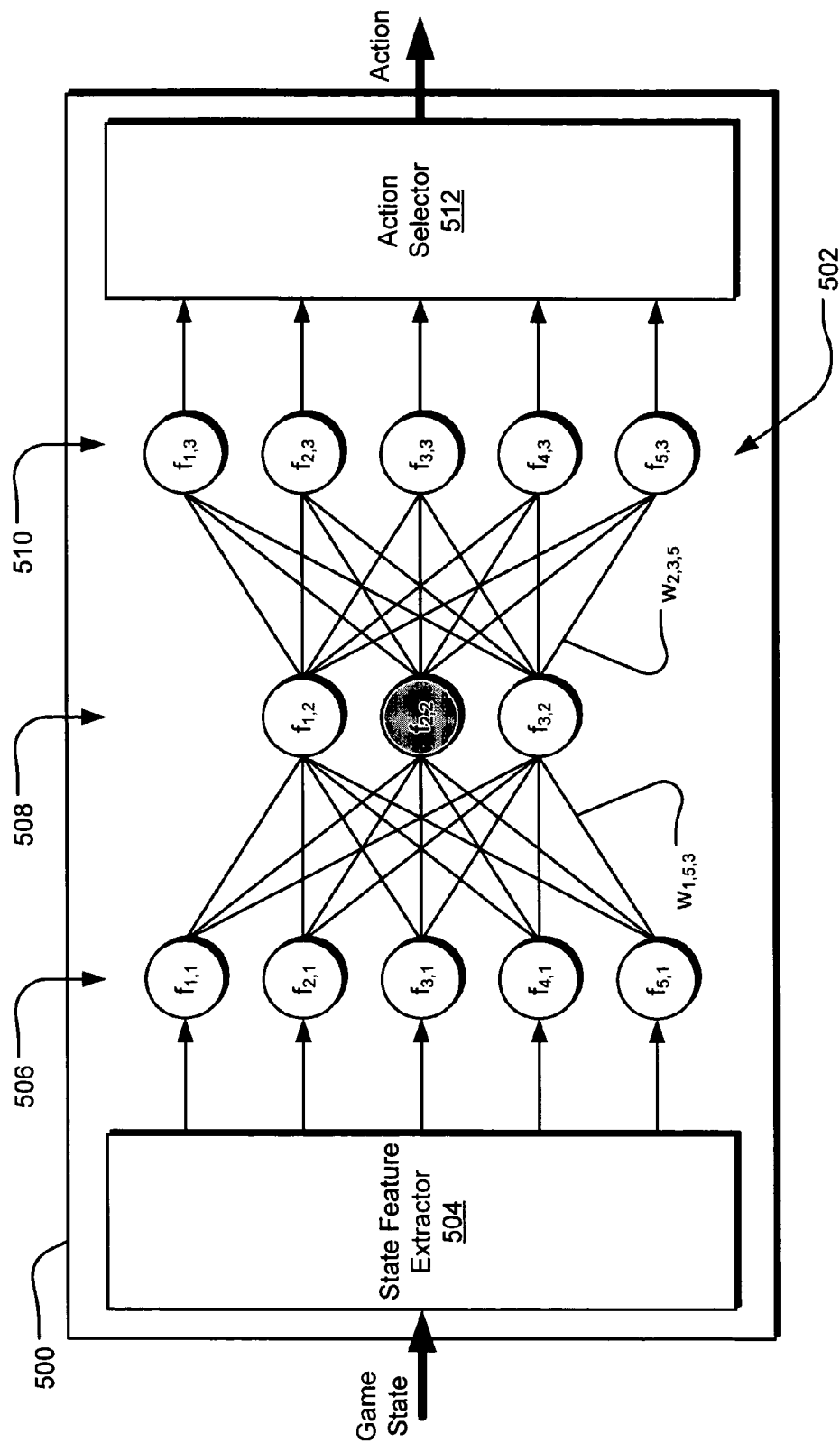
FIG. 5 illustrates a policy implemented by a neural network.

FIG. 5 illustrates a policy 500 implemented by a neural network 502. A game state is received and filtered by a state feature extractor 504. The extracted state features are input to the neural network 502 that acts as a functional representation of the policy. The neural network 502 consists of an input layer 506 and subsequent layers 508 and 510 of computational units referred to as "neurons", which calculate a weighted sum of their inputs from the previous layer, weighted by a number $w_{kij}$ (weight from $i^{th}$ neuron in the $k^{th}$ layer to the $j^{th}$ neuron in the $(k+1)^{th}$ layer) as represented by the incoming edges (examples $w_{1,5,3}$ and $w_{2,3,5}$ are shown).

The neurons output an activation value by applying a squashing function to the weighted sum, e.g., according to exemplary function:

$$f_{2,2} = \tanh\left(\sum_i w_{i,2} f_{i,1}\right).$$

Activations of the previous layer are passed on to the next layer until an output layer is reached. The neural network 502 has an output layer 510 with as many outputs as there are available actions. An action selector 512 uses the output 510 of the neural network 502 to select an action, typically by choosing the action with the highest associated output. Other neural network implementations are also contemplated.

The policy represented by the neural network 502 may be updated to adapt to the agent's experience by changing the weights $w_{kij}$ of the neural network 502. In one implementation, the update equation represents a gradient descent optimization on the squared discrepancy between the predicted Q value $Q(s_n, a_n)$ and the sum of the observed reward $r_n$ and the best possible Q-value $\gamma \max_a Q(s_{n+1}, a)$ (compare to Equation (1)).

Figure 6:
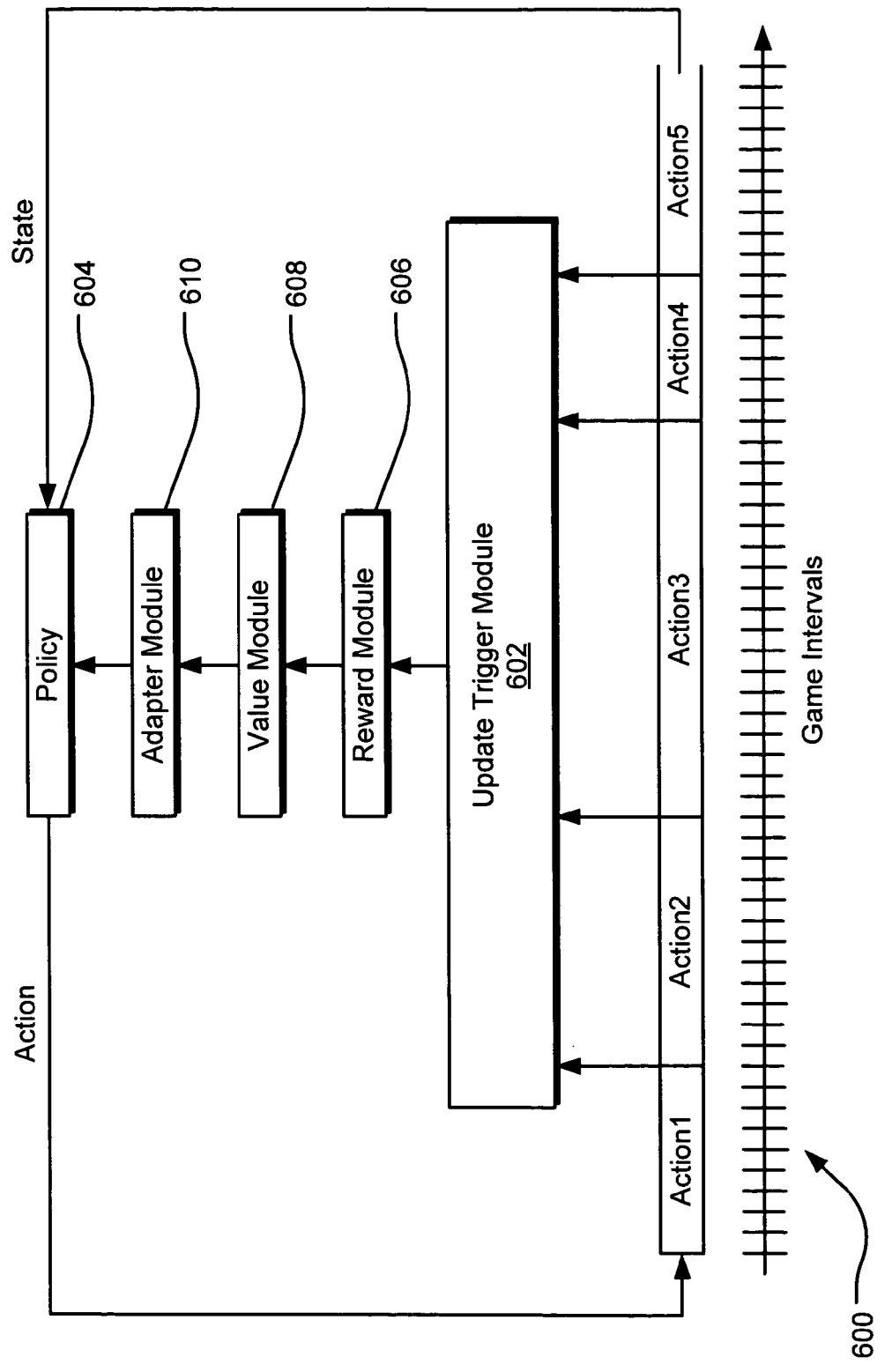
FIG. 6 illustrates update triggering based on action intervals.

FIG. 6 illustrates update triggering based on action intervals. A game timeline 600 includes a sequence of game intervals (represented by the intervals delineated by the hash marks along the timeline 600). As previously described, game intervals represent fundamental intervals recognized by the game engine, such as real-time simulation intervals, video frame intervals, etc. However, an adaptive agent is rewarded (positively or negatively) based on the changes in game state detected between applied actions within the game environment. As such, a policy is generally not subject to reward-driven adaptation with each game interval—only with each action interval. Accordingly, policy updates are properly synchronized with action intervals, which delineate transitions between one action and the next.

In one implementation, an update trigger module 602 monitors a set of available actions (not shown) at each game interval. If no actions are available, the update trigger module 602 does not trigger a new action interval. However, if at least one action is available at the end of a game interval and that action is applied to the current game state within the game environment, the update trigger module 602 triggers a new action interval, thereby triggering an update to the policy 604. Alternative methods of detecting the end of an action interval and triggering the start of a new action interval may be employed. For example, a game engine can announce the end of an action interval or the pending application of a new action to the update trigger module 604.

As suggested by Equation (1), policy updates are synchronized on action intervals. At the end of each action interval, the reward parameter $r_n$ for that action interval is computed by a reward module 606 (on the basis of the resulting game state $s_{n+1}$ and its compliance with the defined goal) and is passed to a value module 608, which computes the new action value $Q^\pi(s_n, a_n)$ based on the input parameters of Equation (1). An adapter module 610 modifies the policy 604 with the new action value (e.g., replaces the old action value with the newly computed action value).

Adaptive agents can be used both in game development and game play. During development, adaptive agents can find unintended weaknesses and errors in existing computer-controlled agents by adaptively learning to exploit programming and configuration errors of such agents during pre-release testing. In addition, a game can be populated at development time with selections of adaptive agents having differently defined goals and/or action sets to provide a rich variety of adaptive computer-controlled agents (e.g., defensive opponents, aggressive opponents, cowardly teammates, etc.) during game play.

Importantly, at game time, adaptive agents provide exciting computer-controlled characters that dynamically adapt to the actions performed by other characters (both human-controlled and computer-controlled) within the gaming environment. As such, human players cannot merely optimize their strategies once and for all with or against a given computer-controlled adaptive agent because the adaptive agent will adapt to the changes in the human player's behavior as the adaptive agent seeks to make progress toward the agent's defined goal.

The exemplary hardware and operating environment of FIG. 7 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer. For example, implementations of the described system are well-suited for desktop computers, laptop computers, set top boxes, video game consoles, handheld video game devices, etc.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used. It should also be understood that exemplary video game systems may be coupled across various communications networks, including LANs, WANs, and global communication networks, such as the Internet.

In an exemplary implementation, a value module, a reward module, an adapter module, a policy, an update trigger module, and other modules may be incorporated as part of the operating system 35, application programs 36, or other program modules 37. A policy, agent actions, game states, reward parameters, action values, action intervals, game intervals and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising: causing one or more processing units to perform instructions to:

detect a first game state at a first action interval of a gaming environment;

select a first action of an adaptive agent for the first game state, wherein to select comprises:

evaluating multiple action values corresponding to multiple possible actions of a policy for the active agent, wherein the policy maps the first game state to the possible actions and includes the multiple action values, and wherein individual action values represent a corresponding reward amount that the adaptive agent can expect to accumulate starting from the first game state by applying a corresponding individual possible action; and selecting a possible action corresponding to a highest action value of the multiple action values as the first action of the adaptive agent;

apply the first action of the adaptive agent to the first game state in the first action interval to produce a second game state in a second action interval within the gaming environment;

determine a reward associated with the first action interval based on compliance with a defined goal within the gaming environment;

compute an action value for the first action interval based on the reward; and modify the policy to reflect the computed action value in correspondence with the first state and the first action.

2. The method of claim 1 wherein to determine comprises: determining the reward associated with the first action interval based on compliance of the second game state with the defined goal.

3. The method of claim 1 wherein to determine comprises: determining the reward associated with the first action interval based on the first game state.

4. The method of claim 1 wherein to determine comprises: determining the reward associated with the first action interval based on the first action.

5. The method of claim 1, further comprising causing the one or more processing units to perform instructions to:

select by the policy a second action of the adaptive agent for application to the second game state in the second action interval.

6. The method of claim 5 wherein the computed action value is a function of the first and second game states and the first and second actions.

7. The method of claim 1, further comprising causing the one or more processing units to perform instructions to:

detect a transition between the first action interval and the second action interval, both the first action interval and the second action interval having durations exceeding a single game interval; and trigger the modifying operation, responsive to detecting the transition.

8. A method of adapting a policy of an adaptive agent toward a defined goal within a gaming environment executing on a computing device, wherein the policy maps game states to actions of a defined set of available actions, the method comprising:

causing one or more processing units to perform instructions to:

detect a first game state at a first action interval of the gaming environment;

apply a first action of the adaptive agent selected by the policy to the first game state in the first action interval to produce a second game state in a second action interval within the gaming environment;

determine a reward value associated with the first action interval based on compliance with the defined goal;

compute an action value for the first action interval, wherein to compute comprises:

computing an expected reward value based at least in part on the reward value, a predefined weighting factor, and a previous action value; and computing a sum of the expected reward value and the previous action value as the action value; and modify the policy to reflect the computed action value in correspondence with the first game state and the first action.

9. The method of claim 8 wherein to determine the reward value is further based on compliance of the second game state with the defined goal.

10. The method of claim 8 wherein to determine the reward is further based on the first game state.

11. The method of claim 8 wherein to determine the reward is further based on the first action.

12. The method of claim 8 further comprising causing the one or more processing units to perform instructions to:

select by the policy a second action of the adaptive agent for application to the second game state in the second action interval.

13. The method of claim 8 further comprising causing the one or more processing units to perform instructions to:

detect a transition between the first action interval and the second action interval, both the first action interval and the second action interval having durations exceeding a single game interval; and trigger the modifying responsive to detecting the transition.

14. A system comprising:

a game engine configured to apply a first action of the adaptive agent selected by a policy to a first game state in a first action interval of a gaming environment to produce a second game state in a second action interval within the gaming environment, wherein the policy maps game states to individual available actions;

a value module configured to compute an action value for the first action interval based at least in part on a reward value and a previous action value, the reward value reflecting a level of compliance with a defined goal within a gaming environment;

an adapter configured to modify the policy to reflect the computed action value in correspondence with the first game state and the first action.

15. The system of claim 14 wherein the adapter is further configured to determine individual reward values associated with the first action interval based on compliance of the second game state with the defined goal and to modify the policy based on the individual reward values.

16. The system of claim 14 wherein the adapter is further configured to determine individual reward values based on individual game states and to modify the policy based on the individual reward values.

17. The system of claim 14 wherein the adapter is further configured to determine individual reward values based on individual actions and to modify the policy based on the individual reward values.

18. A method comprising causing one or more processing units to perform instructions to:

select a first action of an adaptive agent from a plurality of available actions for application to a first state of a gaming environment during a first action interval;

apply the first action within the gaming environment to produce a second state of the gaming environment;

select a second action of the adaptive agent from the plurality of available actions for application to the second state of the gaming environment during a second action interval;

detect a transition between the first action interval and the second action interval, both the first action interval and the second action interval having durations exceeding a single game interval; and modify a policy for the adaptive agent based on compliance with a defined goal, wherein the modifying is triggered in response to detecting the transition, wherein to modify comprises:

computing a reward for the first action interval characterizing compliance of the second state with the defined goal; and computing an action value from an action-value function based on the reward, wherein the function predicts a long-term reward for the adaptive agent starting at the first state, taking the first action, and following the policy thereafter.

19. The method of claim 18 wherein to modify further comprises:

determining the reward based on the first game state, wherein the policy is modified based on the reward.

20. The method of claim 18 wherein to modify further comprises:

determining the reward based on the first action, wherein the policy is modified based on the reward.

* * * * *